United States Patent [19]
Conforti et al.

[11] Patent Number: 5,283,827
[45] Date of Patent: Feb. 1, 1994

[54] DIGITAL LINE CARD FOR INTERFACING A REMOTELY LOCATED DIGITAL TELEPHONE TO A CENTRAL OFFICE SYSTEM

[75] Inventors: Joseph A. Conforti, Phoenix; Thomas C. Bissonnette; Anthony J. Baca, both of Glendale, all of Ariz.

[73] Assignee: AG Communication Systems Corporation, Phoenix, Ariz.

[21] Appl. No.: 615,528

[22] Filed: Nov. 19, 1990

[51] Int. Cl.$^5$ .............................. H04M 9/06
[52] U.S. Cl. .................. 379/399; 370/94.1; 379/28; 379/377
[58] Field of Search ............. 379/27, 28, 29, 377, 379/399; 370/94.1, 60

[56] References Cited
U.S. PATENT DOCUMENTS 4,432,089  2/1984  Wurzburg et al. ............ 379/29
4,642,805  2/1987  Dumas et al. ................ 379/28 X Primary Examiner—James L. Dwyer
Assistant Examiner—M. Shehata
Attorney, Agent, or Firm—Gregory G. Hendricks

[57] ABSTRACT

A digital line card for interfacing a remotely located digital telephone to a central office system by a two-wire connection is disclosed. The digital line card consists of a line interface connected to the two-wire connection. The line interface provides a full duplex transmission link with the remotely located digital telephone over the two-wire connection. A buffer is connected between the line interface and the central office system. The buffer converts data between the line interface and the central office system. The line card further comprising a protocol controller connected to the line interface. The protocol controller performs a packet protocol for communications with the remotely located telephone. To complete the line card, there is provided a processor connected to the protocol controller and to the central office system, under the direction of the central office system, the processor controls the operation of the digital line card and, through the protocol controller means, communicates with and controls the remotely located digital telephone.

17 Claims, 10 Drawing Sheets

FIG. I

DIGITAL LINE CARD FOR INTERFACING A REMOTELY LOCATED DIGITAL TELEPHONE TO A CENTRAL OFFICE SYSTEM

CROSS-REFERENCE TO RELATED APPLICATIONS

The present application is related to the following co-pending U.S. patent applications all being assigned to the same assignee, entitled:

"A CIRCUIT FOR TESTING DIGITAL LINES";
"A MESSAGE ARRANGEMENT AND METHOD USED TO IMPLEMENT A DIGITAL TELEPHONE SYSTEM", Ser. No. 07/615,523 filed on Nov. 19, 1990; and;
"A METHOD OF DOWNLOADING DATA TO A PLURALITY OF DESTINATIONS IN A TELEPHONE SYSTEM", Ser. No. 07/615,522 filed on Nov. 19, 1990.

FIELD OF THE INVENTION

The present invention relates in general to telecommunication systems, and more particularly, to a digital telephone system that is user programmable, uses a standard two-wire interface, and provides a second high-speed circuit switched data channel.

BACKGROUND OF THE INVENTION

Prior to the present invention, remote telephone consoles were implemented as described in U.S. Pat. No. 4,751,696 "CENTREX ATTENDANT CONSOLE INTERFACE". But this implementation was limited because:

1) It required a total of six wires between the central office (CO) and the console;
2) The analog signal is not digitized until reaching the CO, thereby allowing noise to be induced;
3) The line card (CONI) does not provide any call processing functions;
4) The data channel is limited to a low BAUD rate, and;
5) All customer information is stored in the central office's central computer or the remote console.

Most organizations desire each secretary to have a telephone console for answering unattended telephones, determining who is using the telephone, intercepting calls, etc. These features are generally present if the organization purchases a Private Branch Exchange (PBX); however, as stated in U.S. Pat. No. 4,751,696, the telephone industry developed CENTREX to provide many of the same features without the initial capital or maintenance requirements. But, because of the limitation stated above, the number of consoles per CO was limited.

Because of the limited number of consoles, the telecommunications industry developed its CENTREX features to function on the standard telephone instrument. This was accomplished by using "access" codes to indicate which feature was to be used. Each feature generally required a distinct access code.

To simplify the features, and reduce the number of access codes that must be memorized, a programmable telephone was developed. Here, the telephone instrument had feature buttons that sent the appropriate access code. But to answer an unattended telephone the secretary must either forward the unattended telephone to their telephone or be able to hear the unattended telephone ring and press the correct access code (or feature button). To solve this problem, each line to be monitored was split and sent to both the telephone and the console. When the telephone rings (or is busy) the console indicates which line is ringing. But, the number of wires connected to the console can quickly become prohibitive.

It therefore becomes the object of the present invention to provide a console telephone system that allows the user to program its functionality, displays the current status, and can be provided in substantial numbers.

SUMMARY OF THE INVENTION

In order to accomplish the object of the present invention there is provided a digital line card for interfacing a remotely located digital telephone to a central office system by a two-wire connection. The remotely located digital telephone converts a received voice analog signal into a Pulse Code Modulated (PCM) digital signal for transmission to the digital line card through a first data channel. The remotely located digital telephone receives through the first data channel, a PCM digital signal and converts the PCM digital signal into a transmitted voice analog signal. The remotely located digital telephone also provides a second data channel and a control channel.

The digital line card consists of a line interface connected to the two-wire connection. The line interface provides a full duplex transmission link with the remotely located digital telephone over the two-wire connection, whereby the first data channel, the second data channel, and the control channel are transferred over the two-wire connection. The digital line card further consists of a buffer connected to the line interface and the central office system. The buffer converts the first and second data channels between the line interface and central office system.

There is also provided a protocol controller connected to the line interface, which performs a packet protocol over the control channel. To complete the digital line card, there is provided a processor connected to the protocol controller and to the central office system. Under the direction of the central office system, the processor controls the operation of the digital line card, and, through the protocol controller means, communicates with and controls the remotely located digital telephone.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

The present invention requires only two-wires, yet, provides a total of four channels, two 64 Kbps channels (voice or data), a 16 Kbps channel for communications between the telephone and the line card, and a 8 Kbps auxiliary channel for communications with other devices on the line, (i.e. repeaters) and/or with the telephone.

Figure 1:
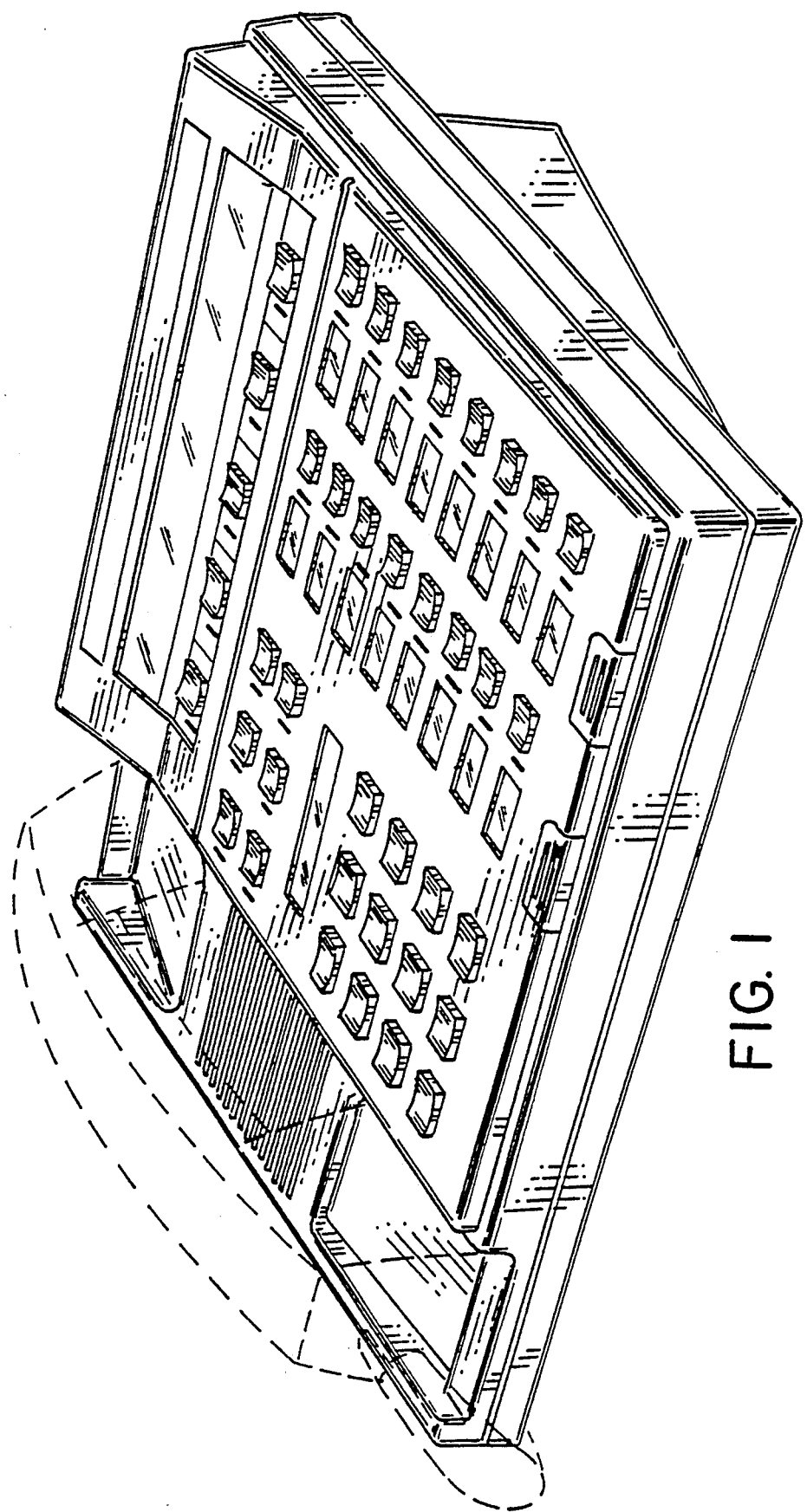
FIG. 1 is a pictorial representation of the Featurephone.
Figure 2:
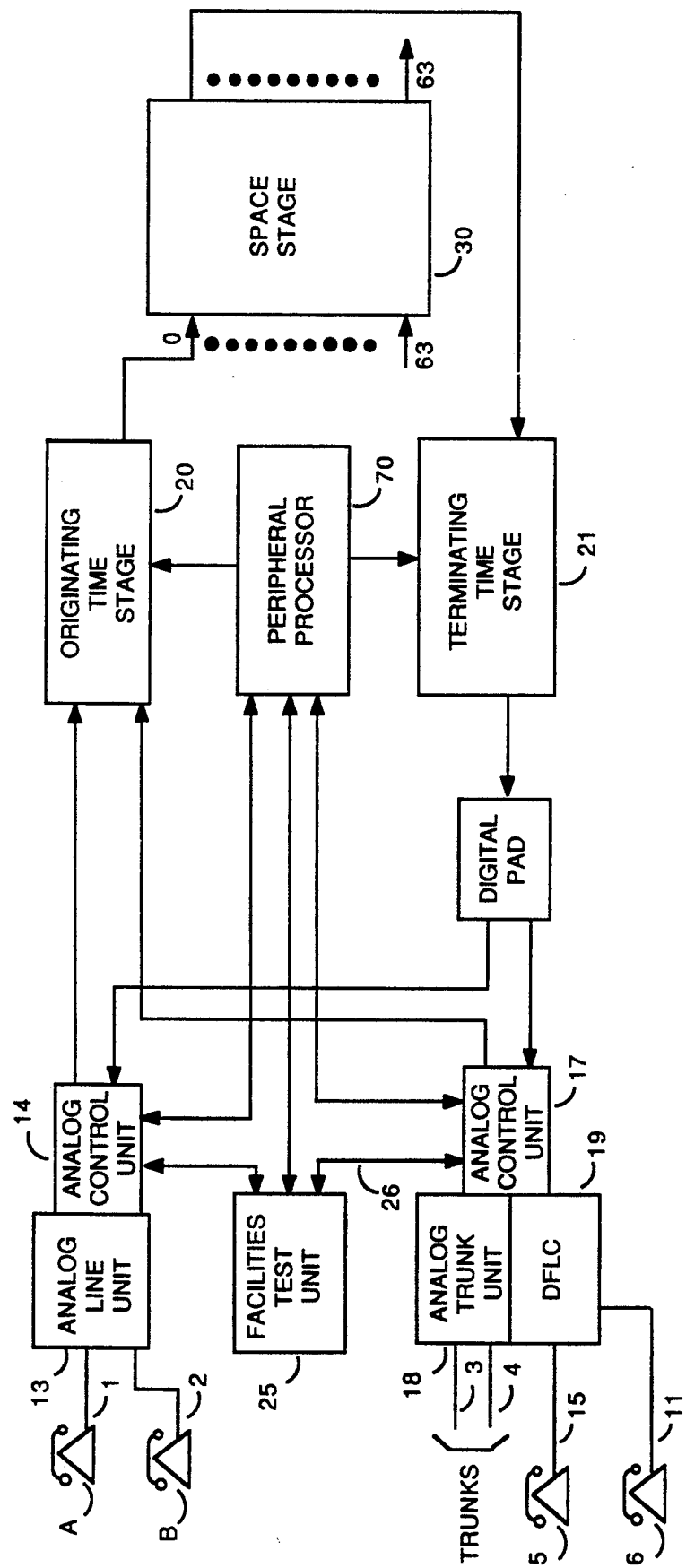
FIG. 2 is a block diagram of a CENTREX network system embodying the present invention.

Referring to FIG. 2, a central office (CO) system having a central exchange (CENTREX) feature is shown. Standard telephone instruments A and B are connected to the switching system, via analog subscriber lines 1 and 2, to Analog Line Unit 13. The analog data received is converted to Pulse Coded Modulation (PCM) by Analog Line Unit 13. The PCM digital data is next sent from ALU 13 to Originating Time Switch 20. PCM data received from the other end is received by ALU 13 from Terminating Time Switch 21. ALU 13 converts the received PCM data to an analog signal which is transmitted down subscriber lines 1 and 2. ALU 13 is also connected to Analog Control Unit 14, which in turn, is connected to Peripheral Processor 70.

Terminating Time Switch is further connected to Trunk Unit 18 through Analog Control Unit 17. Trunks 3 and 4 provide access to subscribers not directly served by this system.

The Digital Facilities Line Card (DFLC) 19 of the present invention is connected to analog control unit 17 and provides an interface for up to two Featurephones. The primary objective of the DFLC is to appear to ALU 17 and PP 70 as standard subscriber lines. This objective requires the DFLC to perform a significant amount of the call processing thereby off-loading PP 70.

Figure 3:
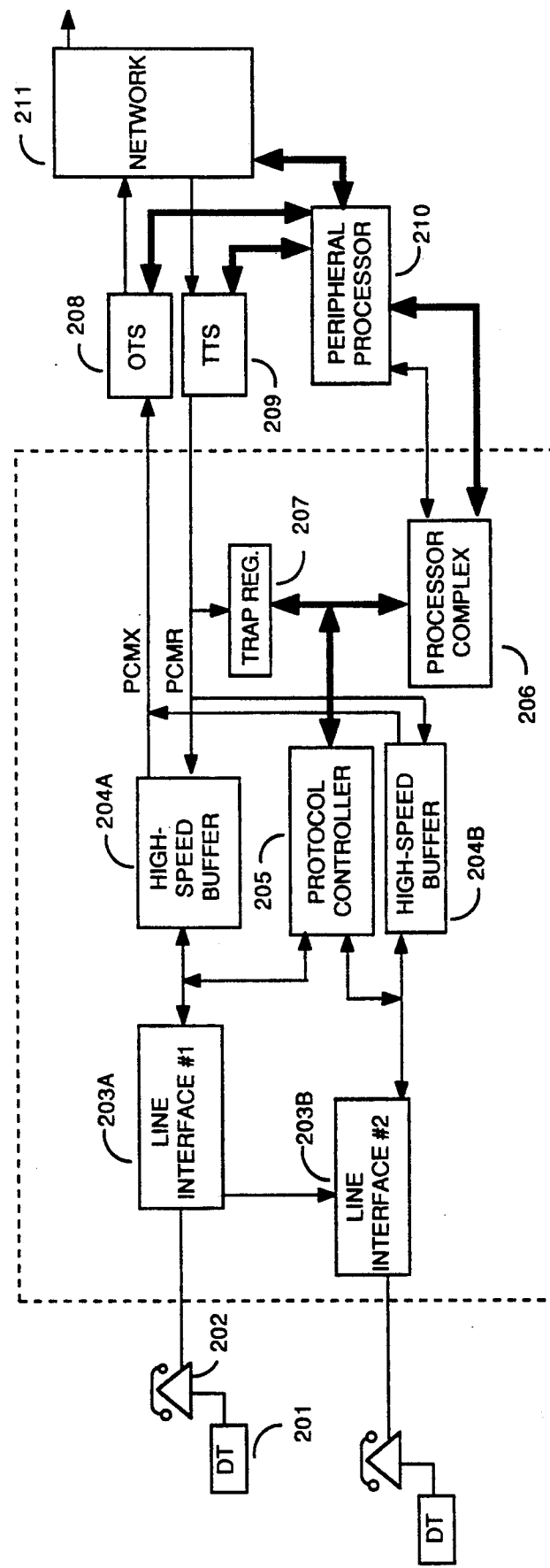
FIG. 3 is a high-level block diagram of the Digital Facilities Line Card.

Turning now to FIG. 3, a block diagram illustrating the DFLC is shown.

The DFLC interfaces to the Featurephone through a single, two-wire communication link. The two-wire interface provides a high-speed, full duplex digital transmission link using echo-cancelling techniques. A total of four digital channels are provided: two 64 Kbps channels, one 16 Kbps channel and one 8 Kbps channel. Where the 64 Kbps channels can be used for PCM voice or high-speed data, the 16 Kbps channel is used to communicate with the Featurephone, and the 8 Kbps auxiliary channel is used to communicate with other devices on the line, (i.e. repeaters) and/or with the Featurephone.

The DFLC interfaces to the system by a PCM interface and a sense/control interface. Data over the PCM interface is transferred to Originating Time Switch (OTS) 208 and received from Terminating Time Switch (TTS) 209. This data is either digitized voice data or circuit switched data and has a data rate of 64 Kbps. (Herein: PCM data means either digitized voice or circuit switched data.)

HIGH-SPEED DATA INTERFACE 204A converts the serial data between the different bit rates of LINE INTERFACE 203A, and OTS 208. In addition, HIGH-SPEED DATA INTERFACE 204A provide a time switch stage. TRAP REGISTER 207 is used to perform diagnostic testing and downloading of information. (These functions are described in more detail in co-applications "A CIRCUIT FOR TESTING DIGITAL LINES", Ser. No. 07/615,529 filed on Nov. 19, 1990 "A METHOD OF DOWNLOADING DATA TO A PLURALITY OF DESTINATIONS IN A TELEPHONE SYSTEM", Ser. No. 07/615,522 filed on Nov. 19, 1990.

Figure 10:
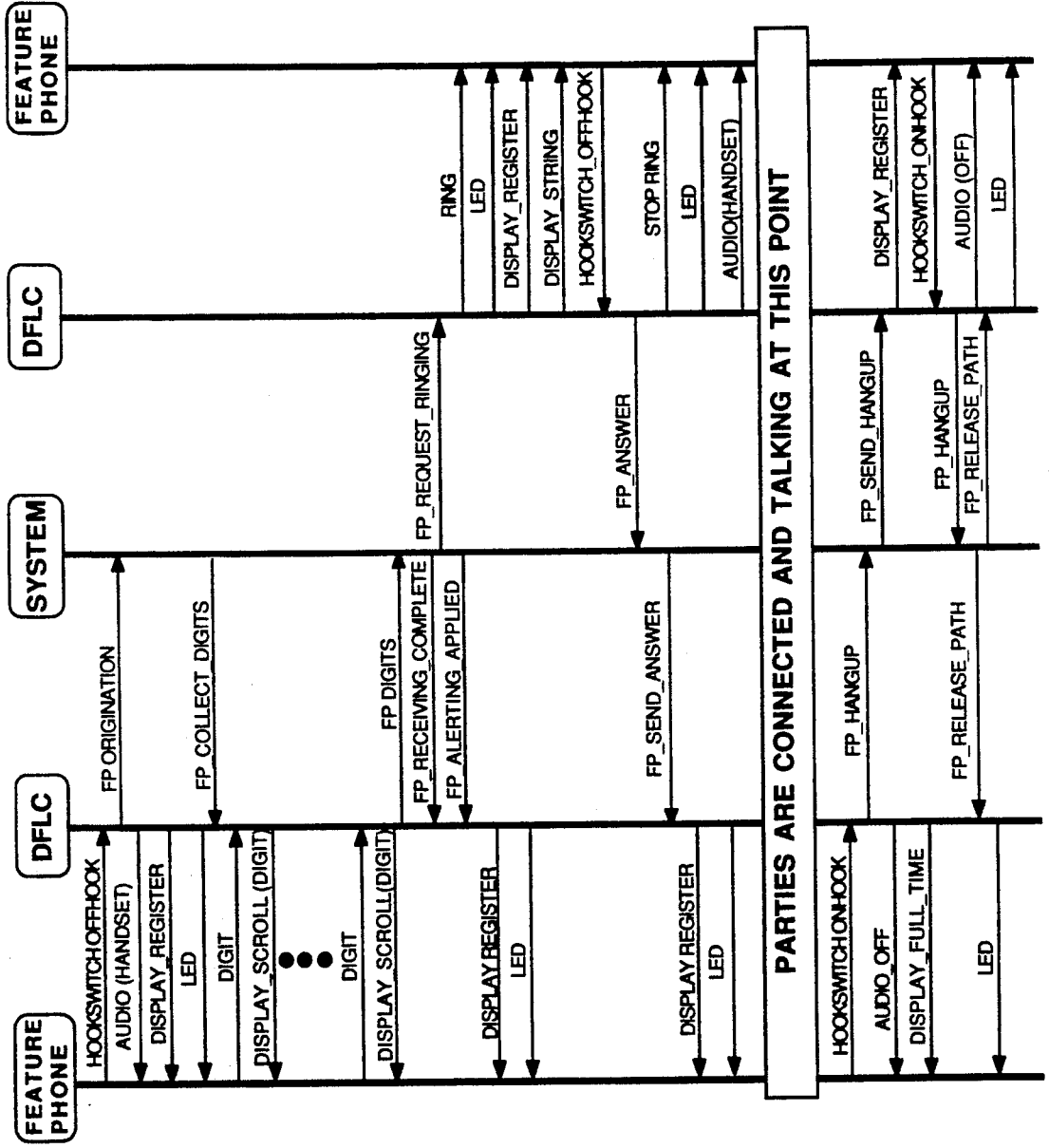
FIG. 10 is a message flow diagram showing the messages passed between the system, Digital Facilities Line Card, and Featurephone, during a call setup and takedown.

Through the sense/control interface, PP 210 communicates with DFLC processor 206, which in turn communicates to the Featurephone 202. Only high-level messages are passed through this interface as shown in FIG. 10. Note: FIG. 10 is discused in more detail later. The sense/control interface consists of eight data lines, four address lines, and associated control lines.

When PP 210 sends a message to DFLC, it writes the message into the DFLC's input buffer, then sets a SYS-DFLC flag on the DFLC. The DFLC, upon receiving the SYS-DFLC flag, reads the message and resets the flag, indicating to PP 210 that it is ready for another message. Conversely, when the DFLC sends a message to PP 210, it writes the message into its output buffer and sets a DFLC-SYS flag. When PP 210 sees the DFLC-SYS bit set it reads the message from the DFLC and resets the DFLC-SYS flag.

PROTOCOL CONTROLLER 205 handles the "bit-level" protocol conversion thereby providing a very reliable data link between the DFLC and the Featurephone.

LINE INTERFACE 203A converts the digital data into an appropriate signal for transmission over a twisted-pair line. The signal from the LINE INTERFACE is transmitted to the Featurephone, where an identical LINE INTERFACE receives the signal and reconstructs the digital data.

Figure 4:
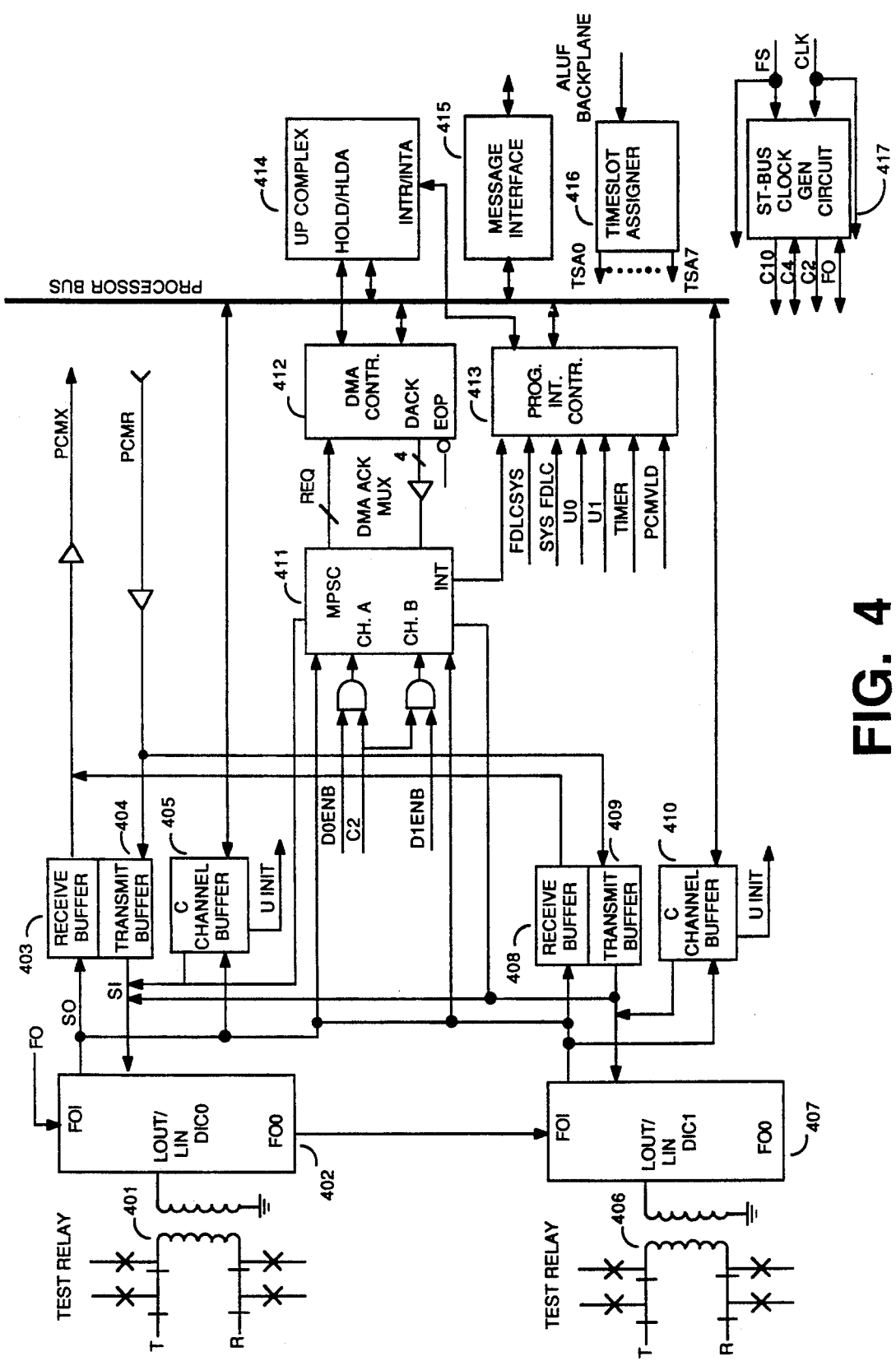
FIG. 4 is a low-level block diagram of the Digital Facilities Line Card.
Figure 5:
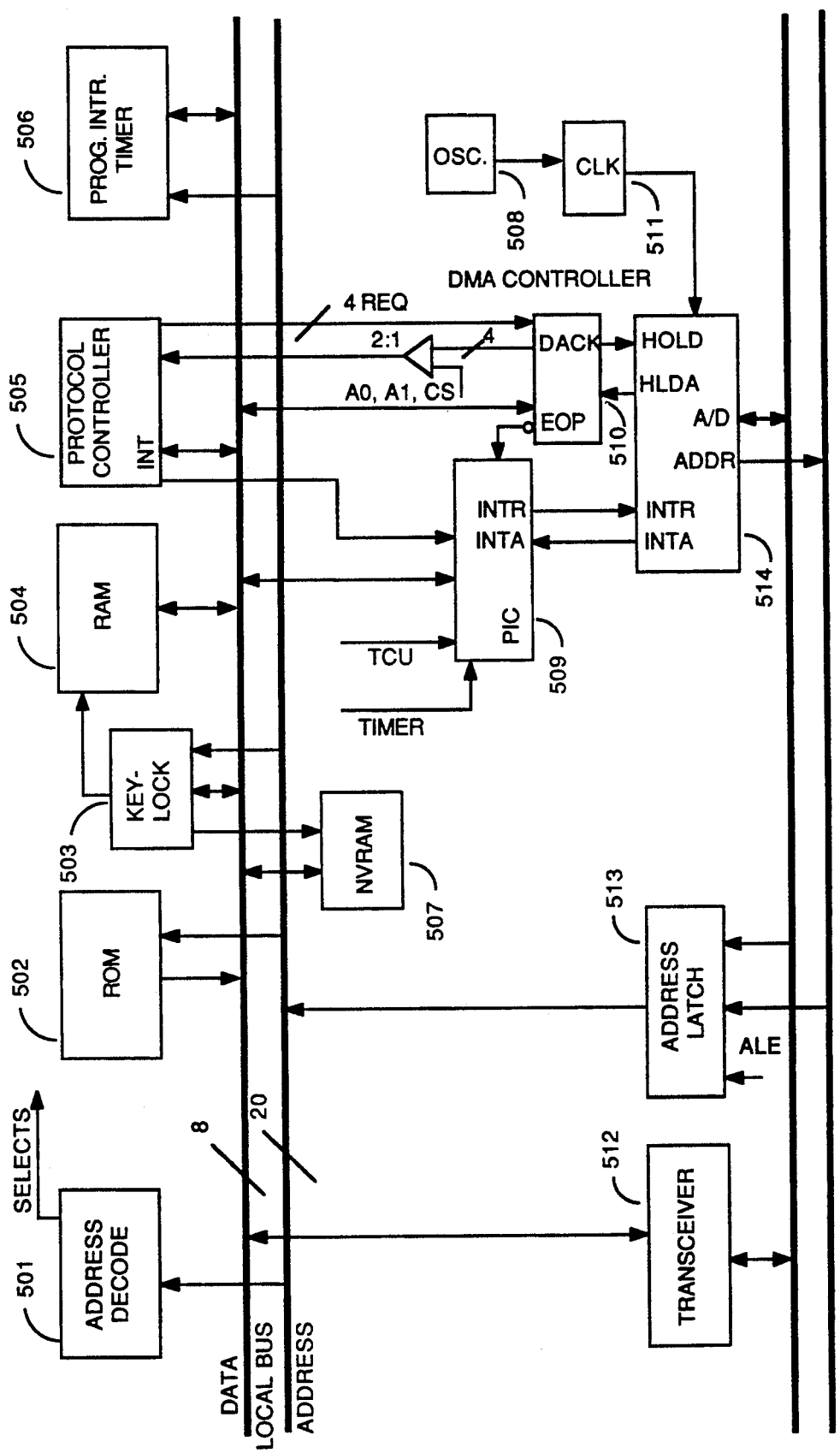
FIG. 5 is a block diagram of the Digital Facilities Line Card's microprocessor complex.

Referring now to FIGS. 4 and 5, a more detailed description will be given. FIG. 4 shows a more detailed block diagram of the DFLC, while FIG. 5 shows the processor complex in greater detail.

TRANSFORMER 401 and Digital Interface Chip (DIC) 402 implement LINE INTERFACE 203A of FIG. 3, and TRANSFORMER 406 and Digital Interface Chip (DIC) 407 implement LINE INTERFACE 203B of FIG. 3. The DICs provide an interface between the line (Tip-and-Ring) on one side, and a Time Division Multiplexed (TDM) serial data-stream on the other. Each DIC uses four TDM time-slots; two channels for the high-speed data, one channel for the link with the Featurephone, and a channel for control and status of the DIC itself. Note: The auxiliary channel is part of the control/status channel. After DIC 402 finishes accessing the TDM data stream, DIC 407 is signaled, allowing DIC 407 access to the TDM data stream during the next four time-slots. With the present implementation, a total of eight DICs can be daisy-chained onto the same bus.

RECEIVE and TRANSMIT BUFFERS 403, 408 and 404, 409 respectively, convert the bit-rate between the system (PCMX and PCMR) and the DICs while preserving the overall data-rate of the channel. All four buffers are under control of TIMESLOT ASSIGNER 416 and CLOCK-GENERATOR 417. TIMESLOT ASSIGNER 416 is programmed by the external PERIPHERAL PROCESSOR, and determines the time slots for each high-speed channel on the PCMS and PCMR busses. CLOCK-GENERATOR 417 produces all the timing signals needed by DICs and is phased locked to a master clock signal provided by the system. Under the control of CLOCK-GENERATOR 417, the buffers are enabled, during the proper time-slot, to receive and transmit serial data from the DICs.

Figure 6:
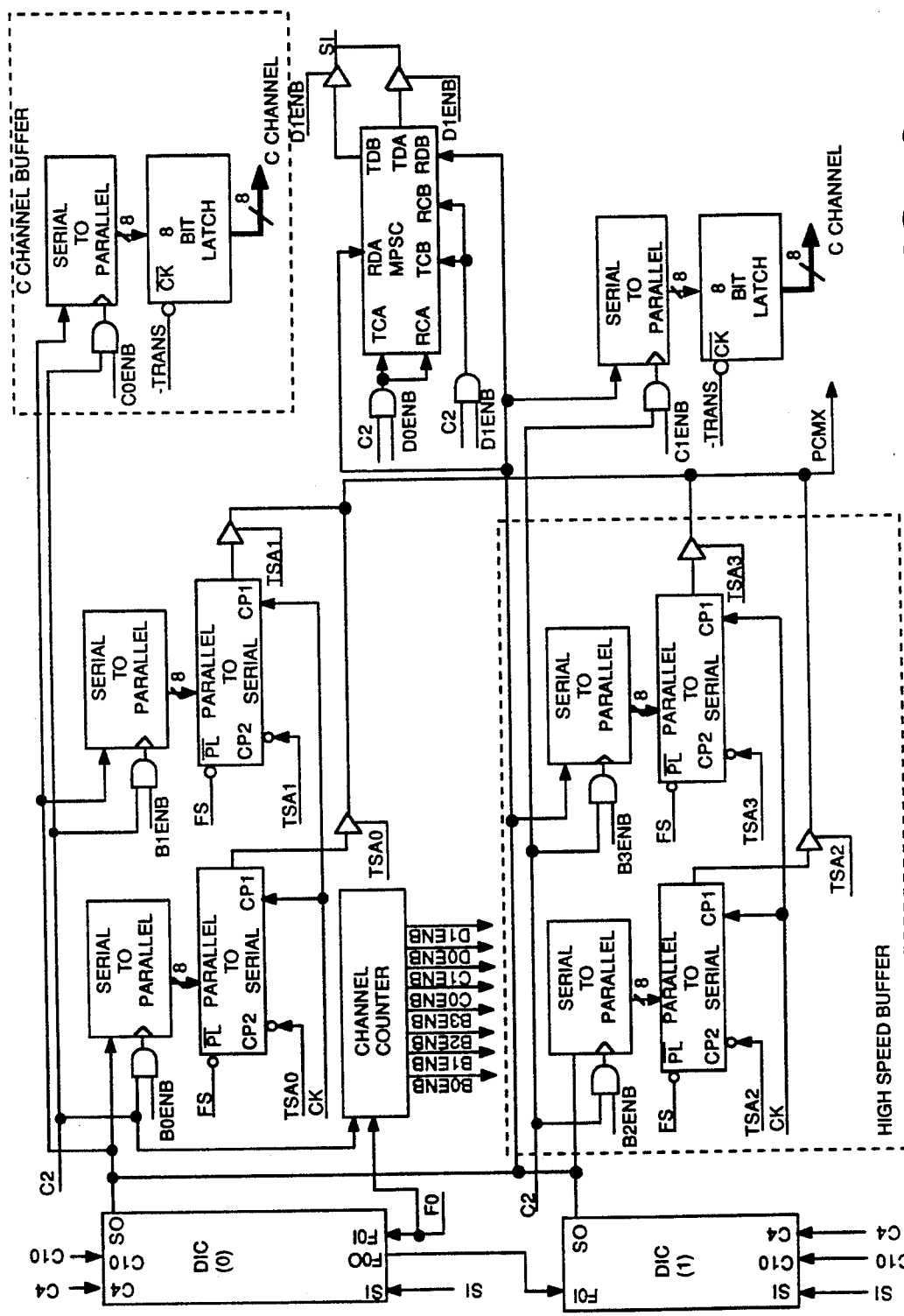
FIG. 6 is a block diagram of the Receive Buffer
Figure 7:
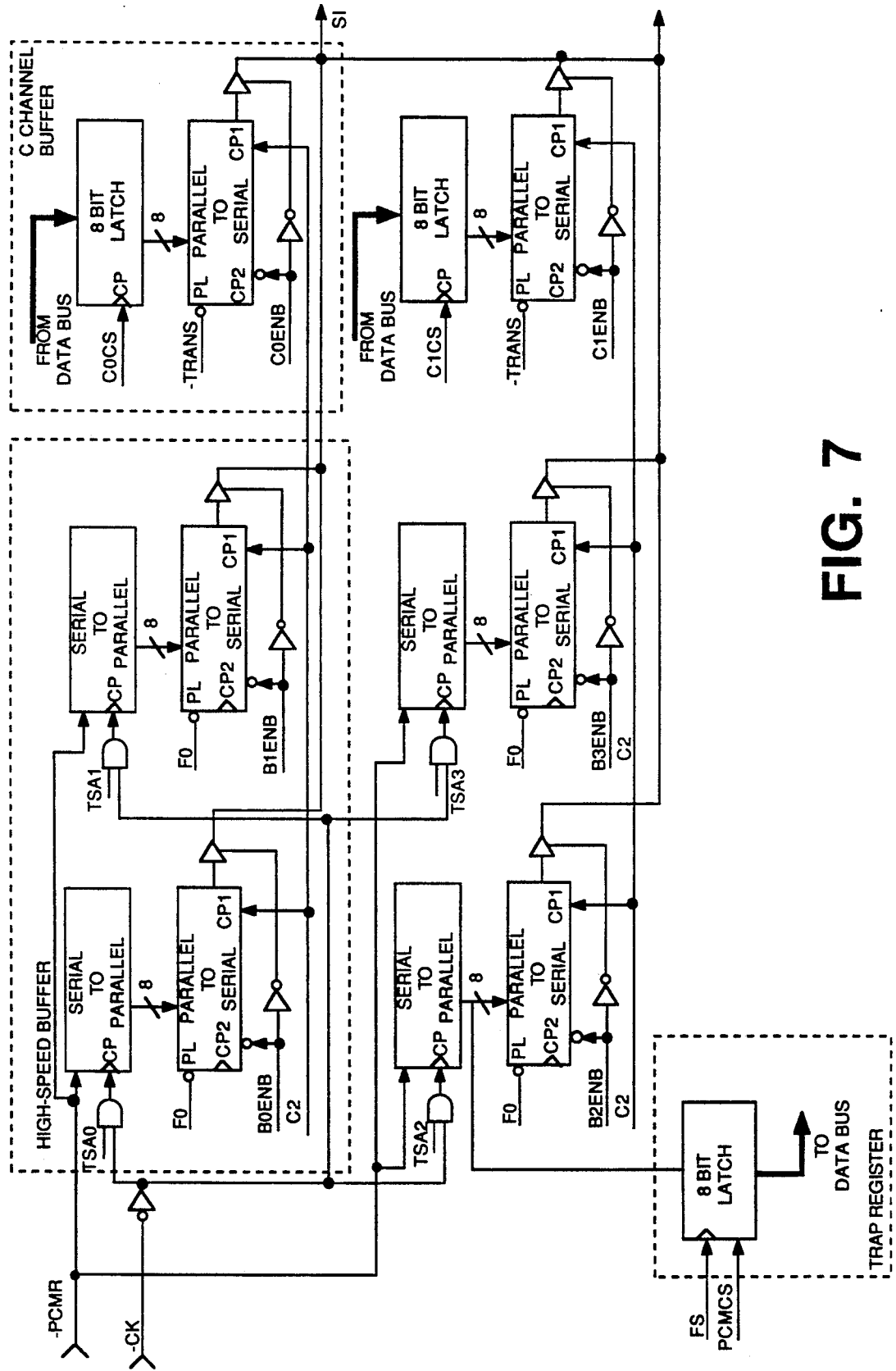
FIG. 7 is block diagram of the Transmit Buffer

Briefly referring to FIGS. 6 and 7 the RECEIVE and TRANSMIT BUFFERS are shown in greater detail. These figures show that the HIGH-SPEED BUFFERS are comprised of serial-to-parallel-to-serial converters, or just called serial-to-serial converters.

Referring back to FIG. 4, CLOCK-GENERATOR 417 also provides timing for C Channel Buffers 405 and 410 and Multi-Protocol Serial Controller (MPSC) 411. The C CHANNEL BUFFERS provide an interface between PROCESSOR COMPLEX 414 and DICs and monitor internal status. Additionally, the C Channel Buffers convert the data between the parallel format of PROCESSOR COMPLEX 414 and the serial format of DICs 402 and 407. The C Channel Buffers allow the PROCESSOR COMPLEX 414 to operate asynchronously to the DICs. The C Channel Buffer, as used in the present invention, is taught in application: "AN INTERFACE CIRCUIT FOR DATA TRANSMISSION BETWEEN A MICROPROCESSOR SYSTEM AND A TIME-DIVISION SYSTEM", U.S. Pat. No. 4,975,911. It should be noted that the auxiliary channel used to communicate with other devices on the line (i.e. repeaters), is transferred by the C Channel Buffers.

MPSC 411 provides bit-level protocol functions, thereby, providing a highly reliable data link between the DFLC and Featurephone. Because of the relatively high data rate of this channel, (16 Kbps times two, one for each Featurephone) DMA controller 412 interfaces MPSC 411 to PROCESSOR COMPLEX 414. This allows data to be transferred between the MPSC and the PROCESSOR COMPLEX with very little overhead.

PROCESSOR COMPLEX 414 interfaces to the system through MESSAGE INTERFACE 415. Through this interface, the system passes high-level commands to the DFLC, upon which, the DFLC performs all the low-level computing and communications with the Featurephone.

FIG. 5 shows the processor complex in more detail. It is apparent that some of the components from FIG. 4 appear here also. From this figure it is obvious to a person of ordinary skill in the art that the processor complex is of a basic microprocessor configuration, however, there are a few additions. For example, this complex has an engineerable amount of Non-volatile RAM 507 (NVRAM) for storing customer information. Also, there is a RAM KEY LOCK 503 which allows MICROPROCESSOR 514 to "write-product" Non-volatile RAM 507 and individual 1K byte pages of RAM 504.

Figure 8:
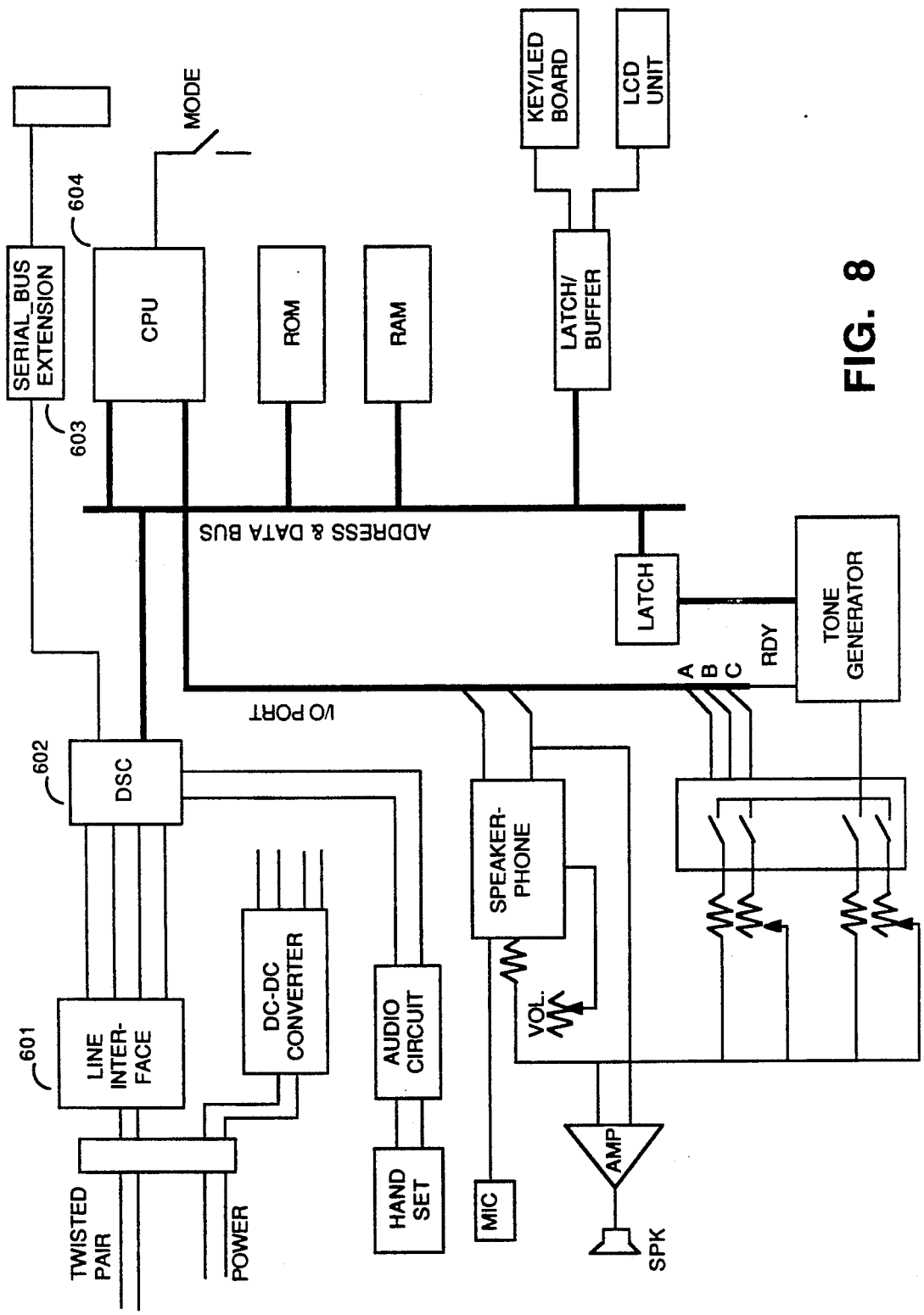
FIG. 8 is a block diagram of the Featurephone.

Referring to FIG. 8, a block diagram of the Featurephone is shown. The signal from the DFLC is received by LINE INTERFACE 601. LINE INTERFACE 601 is identical to the line interface on the DFLC with the exception that it operates in a slave mode. In the slave mode, all timing is derived from the two-wire line, whereas in the master mode, all timing signals must be externally derived and supplied to the line interface. The Digital Subscriber Controller (DSC) 602 provides bit-level protocol control and channel separation. CPU 604 provides the higher level protocol control, in addition to controlling other functions for the telephone. The Featurephone does not perform any call processing functions, it simply reports events (buttons being pushed, off-hook . . . etc.) to the DFLC and performs actions that the DFLC commanded (blink LED, display message, enable amp . . . etc.).

Figure 9:
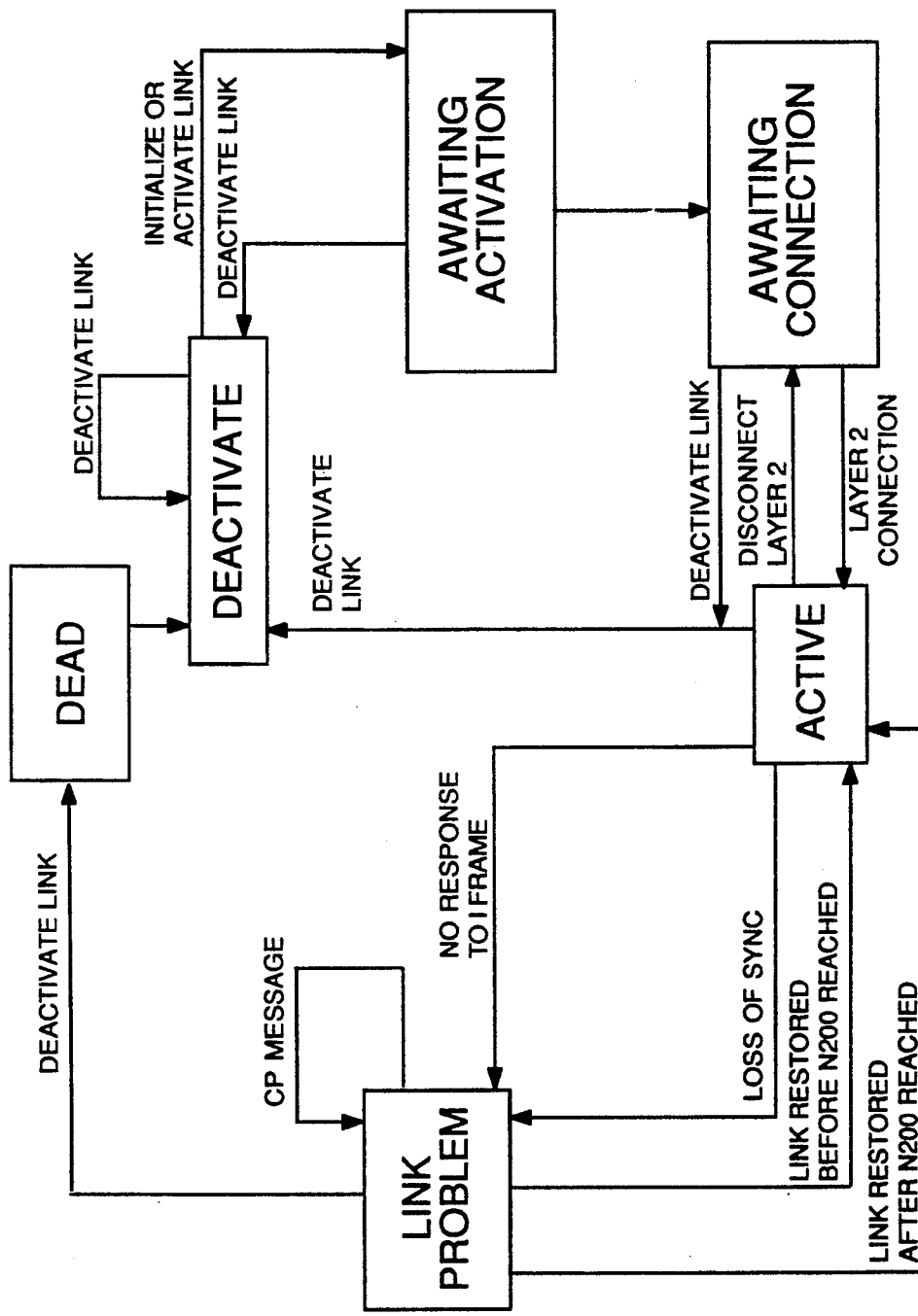
FIG. 9 is a state diagram showing the states of activation for the Digital Facilities Line Card.

Unlike a POTS line, here, the link between the DFLC and Featurephone is always active. Instead of the line card detecting an off-hook, the Featurephone detects the off-hook and sends the appropriate message to the DFLC. Referring to FIG. 9, when the link is first activated or initialized, the various levels of the link must be connected. When the link is first powered-up, or after testing of the link, the link is in the DEAD state. After performing initialization of the DFLC, the DEACTIVATE state is automatically entered. The link will stay in this state until the DFLC receives an INITIALIZE or ACTIVATE LINK message from the system.

After receiving an INITIALIZE or ACTIVATE LINK message the AWAITING ACTIVATION state is entered. During this time the line interface circuit is activated and time is allowed for the DFLC line interface and the Featurephone interface to synchronize. If, after a predetermined amount of time has passed, the line interfaces do not synchronize, the DFLC returns to the DEACTIVATE state, and an failure message is sent to the system.

After the line interfaces synchronize, the AWAITING CONNECTION state is entered. During this time the protocol controller of the DFLC and the Featurephone are allowed to synchronize. If, after a predetermined amount of time has passed, the protocol controllers do not synchronize, the DFLC returns to the DEACTIVATE state, and a failure message is sent to the system.

Once the protocol controllers synchronize, the DFLC enters the ACTIVE state. In this state, the DFLC's processor complex and the Featurephone's processor can exchange messages and calls can be originated and terminated. The ACTIVE state can be exited by: (1) A message from the system to deactivate; (2) The Protocol Controller losing synchronization; (3) The Line Interface losing synchronization; or; (4) The Featurephone not responding.

A DEACTIVATE message from the system causes the DFLC to change to the DEACTIVATE state. Should the protocol controller lose synchronization, the AWAITING CONNECTION state is entered.

If the line interface loses synchronization or the Featurephone does not respond, the LINK PROBLEM state is entered. Her, there is an attempt to restore the link; if the link is restored prior to time N200 expiring, the ACTIVE state is reentered, and a report is sent to the system. This type of outage is generally caused by a "glitch" on the line, and is short in duration so that the protocol controllers do not lose synchronization. If the link is not restored prior to timer N200 expiring but before a predetermined time, the ACTIVE state is reentered, and a report is sent to the system. It may be necessary to enter the AWAITING CONNECTION state because the protocol controllers may have lost synchronization. If, after a predetermined amount of time, the link is not restored, the DEACTIVATE state is entered and an error report is sent to the system.

As stated earlier, once in the ACTIVE state, the DFLC's processor complex and the Featurephone's processor can exchange messages and calls can be originated and terminated. Referring to FIG. 10 some of the messages transferred between the system, DFLC, and Featurephone when a Featurephone calls another Featurephone are shown.

The originating Featurephone goes off-hook causing a message to be sent to the DFLC. The DFLC then sends a FP—ORIGINATION message to the system indicating that the Featurephone is originating a call. At the same time the DFLC sends to the Featurephone messages to turn on the audio amp, display "Please Dial", and blink on LED to indicate that the line is in use. The system tells the DFLC to COLLECT—DIGITS. As each digit is pressed, it is sent from the Featurephone to the DFLC and the DFLC sends the digit back to the Featurephone to display. After the DFLC has collected all the digits, the DFLC sends them to the system. Assuming a valid number was dialed, the system tell the DFLC that the terminating telephone is ringing; the DFLC in turn sends to the Featurephone the string "Ringing" to display.

The system then sends a REQUEST—RINGING message to the terminating DFLC. The terminating DFLC then sends to the terminating Featurephone messages causing it to ring, blink on the LED to indicate in-use, and display a short message and the calling parties number. When the telephone is answered, the terminating Featurephone sends an OFF-HOOK message to the DFLC. The DFLC then sends FP—ANSWER to the system. Simultaneously, the DFLC sends to the terminating Featurephone messages to stop the ringing, turn on the LED, and turn on the audio.

Once the system receives the FP—ANSWER MESSAGE, it sends FP—SEND—ANSWER to the originating DFLC. The DFLC then tells the Featurephone to display a message (i.e. Answer) and turn on the LED. Both parties are talking and no further call processing is done until one party hangs up. The remainder of FIG. 10 shows the hang-up call processing messages.

From FIG. 10 it is apparent that the DFLC does a substantial amount of call processing and the Featurephone is relatively a "dumb" instrument. This allows the Featurephone to be less complex, leading to higher reliability, smaller size, lower power, and lower cost.

All the Featurephone buttons except the digits are programmable by the user. Once the user initiates the programming sequence, a series of menus are displayed to aid the programming process. The entire programming process is handled by the DFLC, the central office system does not participate. Programming information is stored in the nonvolatile RAM of the DFLC. Should the DFLC need to be replaced, the central office system retrieves the information from the present DFLC prior to removal. After the new DFLC is placed into the central office system, the central office system down-loads the customers information. It should be noted that only during a DFLC card replacement is the customers database ever loaded into the central office system.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A digital line card for interfacing a remotely located digital telephone to a central office system by a two-wire connection, said digital line card comprising:
    a line interface means connected to said two-wire connection, said line interface means provides a full duplex transmission link with said remotely located digital telephone over said two-wire connection;
    a buffer means connected to said line interface means and said central office system, said buffer means converts data between said line interface means and said central office system;
    a protocol controller means connected to said line interface means, said protocol controller means performs a packet protocol; and
    a processor means connected to said protocol controller means and to said central office system, under the direction of said central office system, said processor means controls the operation of said digital line card, and said processor means, through said protocol controller means, communicates with and controls said remotely located digital telephone;
    said processor means further comprising:
    a microprocessor means arranged to control the operations of said digital line card;
    a Read Only Memory (ROM) means for storing a boot program used by said microprocessor means;
    a Random Access Memory (RAM) means used by said microprocessor means for storing an operating program and for temporary storage; and
    a NonVolatile RAM (NVRAM) means for retention of data when power to said digital line card is removed, and;
    a Keylock means connected to said microprocessor means, said RAM means, and said NVRAM means, said Keylock means allows said microprocessor means to lock said NVRAM means and to lock individual pages of said RAM means such that said microprocessor means can only read said located NVRAM means and said locked individual pages of said RAM means.

2. A digital line card as claimed in claim 1, said buffer means further comprising:
    a receive buffer means for converting data from said line interface means to said central office system, and;
    a transmit buffer means for converting data from said central office system to said line interface means.

3. A digital line card for interfacing a remotely located digital telephone to a central office message by a two-wire connection, said digital line card comprising:
    a line interface means connected to said two-wire connection, said line interface means provides a full duplex transmission link with said remotely located digital telephone over said two-wire connection;
    a buffer means connected to said line interface means and said central office system, said buffer means converts data between said line interface means and said central office system;
    a protocol controller means connected to said line interface means, said protocol controller means performs a packet protocol; and
    a processor means connected to said protocol controller means and to said central office system, under the direction of said central office system, said processor means controls the operation of said digital line card, and said processor means, through said protocol controller means, communicates with and controls said remotely located digital telephone;
    said processor means further comprising:
    a microprocessor means arranged to control the operations of said digital line card;
    a Read Only Memory (ROM) means for storing a boot program used by said microprocessor means;

a Random Access Memory (RAM) means used by said microprocessor means for storing an operating program and for temporary storage; and a Direct Memory Access (DMA) means connected to said protocol controller means, said RAM means, and said microprocessor means, said DMA means arranged to transfer data between said protocol controller means and said RAM means independent of said microprocessor means.

4. A digital line card as claimed in claim 3, said buffer means further comprising:

a receive buffer means for converting data from said line interface means to said central office system, and;

a transmit buffer means for converting data from said central office system to said line interface means.

5. A digital line card for interfacing a remotely located digital telephone to a central office system by a two-wire connection, said digital line card comprising:

a line interface means connected to said two-wire connection, said line interface means provides a full duplex transmission link with said remotely located digital telephone over said two-wire connection;

a buffer means connected to said line interface means and said central office system, said buffer means converts data between said line interface means and said central office system;

a protocol controller means connected to said line interface means, said protocol controller means performs a packet protocol; and a processor means connected to said protocol controller means and to said central office system, under the direction of said central office system, said processor means controls the operation of said digital line card, and said processor means, through said protocol controller means, communicates with and controls said remotely located digital telephone;

said processor means further comprising:

a microprocessor means arranged to control the operations of said digital line card;

a Read Only Memory (ROM) means for storing a boot program used by said microprocessor means;

a Random Access Memory (RAM) means used by said microprocessor means for storing an operating program and for temporary storage; and a message interface means connected between said microprocessor means and said central office system, said message interface means provides a communication channel between said microprocessor means and said central office system.

6. A digital line card as claimed in claim 5, said buffer means further comprising:

a receive buffer means for converting data from said line interface means to said central office system, and;

a transmit buffer means for converting data from said central office system to said line interface means.

7. A digital line card for interfacing a remotely located digital telephone to a central office system by a two-wire connection, said digital line card comprising:

a line interface means connected to said two-wire connection, said line interface means provides a full duplex transmission link with said remotely located digital telephone over said two-wire connection;

a receive buffer means for converting data from said line interface means to said central office system;

a transmit buffer means for converting data from said central office system to said line interface means;

a protocol controller means connected to said line interface means, said protocol controller means performs a packet protocol;

a microprocessor means arranged to control the operations of said digital line card;

a Read Only Memory (ROM) means for storing a boot program used by said microprocessor means;

a Random Access Memory (RAM) means used by said microprocessor means for storing an operating program and for temporary storage;

a NonVolatile RAM (NVRAM) means for retention of data when power to said digital line card is removed;

a Keylock means connected to said microprocessor means, said RAM means, and said NVRAM means, said Keylock means allows said microprocessor means to lock said NVRAM means and to lock individual pages of said RAM means such that said microprocessor means can only read said locked NVRAM means and said locked individual pages of said RAM means;

a Direct Memory Access (DMA) means connected to said protocol controller means, said RAM means, and said microprocessor means, said DMA means arranged to transfer data between said protocol controller means and said RAM means independent of said microprocessor means, and;

a message interface means connected between said microprocessor means and said central office system, said message interface means provides a communication channel between said microprocessor means and a processor in said central office system.

8. A digital line card as claimed in claim 7, said digital line card further comprising:

a clock generator means for generating a first plurality of clock signals, said clock generator means phase locks to a master clock from said central office system, and;

a timeslot assigner means for generating a second plurality of clock signals derived from said master clock.

9. A digital line card as claimed in claim 8, wherein:

said receive buffer means comprises a receive serial-to-serial converter means connected to said line interface means and said central office system, said receive serial-to-serial converter means arranged to receive said first plurality of clock signals and said second plurality of clock signals;

said transmit buffer means comprises a transmit serial-to-serial converter means connected to said central office system and said line interface means, said transmit serial-to-serial converter means arranged to receive said first plurality of clock signals and said second plurality of clock signals;

said first plurality of clock signals enabling said receive serial-to-serial converter means when said line interface means is ready to transmit data, and, said first plurality of clock signals enabling said transmit serial-to-serial converter means when said line interface means is ready to receive data, and;

said second plurality of clock signals enabling said receive serial-to-serial converter means when said central office system is ready to receive data, and, said second plurality of clock signals enabling said transmit serial-to-serial converter means when said central office system is ready to transmit data.

10. A digital line card for interfacing a remotely located digital telephone to a central office system by a two-wire connection, said remotely located digital telephone converts a received analog signal into a Pulse Code Modulated (PCM) digital signal for transmission to said digital line card through a first data channel, said remotely located digital telephone receives from said digital line card, through said first data channel, said PCM digital signal, said remotely located digital telephone converts said PCM digital signal into a transmitted analog signal, said remotely located digital telephone also provides a second data channel and a control channel, said digital line card comprising:

a line interface means connected to said two-wire connection, said line interface means provides a full duplex transmission link with said remotely located digital telephone over said two-wire connection, whereby said first data channel, said second data channel, and said control channel are transferred over said two-wire connection;

a buffer means connected to said line interface means and said central office system, said buffer means converts said first data channel and said second data channel between said line interface means and said central office system;

a protocol controller means connected to said line interface means, said protocol controller means arranged to perform a packet protocol over said control channel; and a processor means connected to said protocol controller means and to said central office system, under the direction of said central office system, said processor means controls the operation of said digital line card, and, said processor means through said protocol controller means, communicates with and controls said remotely located digital telephone;

said processor means further comprising:

a microprocessor means arranged to control the operations of said digital line card;

a Read Only Memory (ROM) for storing ak boot program used by said microprocessor means, and;

a Random Access Memory (RAM) means used by said microprocessor means for storing an operating program and for temporary storage; and a NonVolatile RAM (NVRAM) means for retention of data when power to said digital line card is removed, and;

a Keylock means connected to said microprocessor means, said RAM means, and said NVRAM means, said Keylock means allows said microprocessor means to lock said NVRAM means and to lock individual pages of said RAM means such that said microprocessor means can only read said locked NVRAM means and said locked individual pages of said RAM means.

11. A digital line card as claimed in claim 10, said buffer means further comprising:

a receive buffer means for converting said first data channel and said second data channel from said line interface means to said central office system, and;

a transmit buffer means for converting said first data channel and said second data channel from said central office system to said line interface means.

12. A digital line card as claimed in claim 11, said digital line card further comprising:

a clock generator means for generating a first plurality of clock signals, said clock generator means phase locks to a master clock from said central office system, and;

a timeslot assigner means for generating a second plurality of clock signals derived from said master clock.

13. A digital line card as claimed in claim 12, wherein:

said receive buffer means comprises a receive serial-to-serial converter means connected to said line interface means and said central office system, said receive serial-to-serial converter means arranged to receive said first plurality of clock signals and said second plurality of clock signals;

said transmit buffer means comprises a transmit serial-to-serial converter means connected to said central office system and said line interface means said transmit serial-to-serial converter means arranged to receive said first plurality of clock signals and said second plurality of clock signals;

said first plurality of clock signals enabling said receive serial-to-serial converter means when said line interface means is ready to transmit said first data channel, alternatively, said first plurality of clock signals enabling said receive serial-to-serial converter means when said line interface means is ready to transmit said second data channel, and, said first plurality of clock signals enabling said transmit serial-to-serial converter means when said line interface means is ready to receive said first data channel, alternatively, said first plurality of clock signals enabling said transmit serial-to-serial converter means when said line interface means is ready to receive said second data channel, and;

said second plurality of clock signals enabling said receive serial-to-serial converter means when said central office system is ready to receive said first data channel, alternatively, said second plurality of clock signals enabling said receive serial-to-serial converter means when said central office system is ready to receive said second data channel, and, said second plurality of clock signals enabling said transmit serial-to-serial converter means when said central office system is ready to transmit said first data channel, alternatively, said second plurality of clock signals enabling said transmit serial-to-serial converter means when said central office system is ready to transmit said second data channel.

14. A digital line card for interfacing a remotely located digital telephone to a central office system by a two-wire connection, said remotely located digital telephone converts a received analog signal into a Pulse Code Modulated (PCM) digital signal for transmission to said digital line card through a first data channel, said remotely located digital telephone receives from said digital line card, through said first data channel, said PCM digital signal, said remotely located digital telephone converts said PCM digital signal into a transmitted analog signal, said remotely located digital telephone also provides a second data channel and a control channel, said digital line card comprising:

a line interface means connected to said two-wire connection, said line interface means provides a full duplex transmission link with said remotely located digital telephone over said two-wire connection, whereby said first data channel, said second data channel, and said control channel are transferred over said two-wire connection;

a buffer means connected to said line interface means and said central office system, said buffer means converts said first data channel and said second data channel between said line interface means and said central office system;

a protocol controller means connected to said line interface means, said protocol controller means arranged to perform a packet protocol over said control channel; and a processor means connected to said protocol controller means and to said central office system, under the direction of said central office system, said processor means controls the operation of said digital line card, and, said processor means through said protocol controller means, communicates with and controls said remotely located digital telephone;

said processor means further comprising:

a microprocessor means arranged to control the operations of said digital line card;

a Read Only Memory (ROM) for storing a boot program used by said microprocessor means, and;

a Random Access Memory (RAM) means used by said microprocessor means for storing an operating program and for temporary storage; and a Direct Memory Access (DMA) means connected to said protocol controller means, said RAM means, and said microprocessor means, said DMA means arranged to transfer data between said protocol controller means and said RAM means independent of said microprocessor means.

15. A digital line card as claimed in claim 14, said buffer means further comprising:

a receive buffer means for converting said first data channel and said second data channel from said line interface means to said central office system, and;

a transmit buffer means for converting said first data channel and said second data channel from said central office system to said line interface means.

16. A digital line card for interfacing a remotely located digital telephone to a central office system by a two-wire connection, said remotely located digital telephone converts a received analog signal into a Pulse Code Modulated (PCM) digital signal for transmission to said digital line card through a first data channel, said remotely located digital telephone receives from said digital line card, through said first data channel, said PCM digital signal, said remotely located digital telephone converts said PCM digital signal into a transmitted analog signal, said remotely located digital telephone also provides a second data channel and a control channel, said digital line card comprising:

a line interface means connected to said two-wire connection, said line interface means provides a full duplex transmission link with said remotely located digital telephone over said two-wire connection, whereby said first data channel, said second data channel, and said control channel are transferred over said two-wire connection;

a buffer means connected to said line interface means and said central office system, said buffer means converts said first data channel and said second data channel between said line interface means and said central office system;

a protocol controller means connected to said line interface means, said protocol controller means arranged to perform a packet protocol over said control channel; and a processor means connected to said protocol controller means and to said central office system, under the direction of said central office system, said processor means controls the operation of said digital line card, and, said processor means through said protocol controller means, communicates with and control said remotely located digital telephone;

said processor means further comprising:

a microprocessor means arranged to control the operations of said digital line card;

a Read Only Memory (ROM) for storing a boot program used by said microprocessor means, and;

a Random Access Memory (RAM) means used by said microprocessor means for storing an operating program and for temporary storage; and a message interface means connected between said microprocessor means and said central office system, said message interface means provides a communication channel between said microprocessor means and said central office system.

17. A digital line card as claimed in claim 16, said buffer means further comprising:

a receive buffer means for converting said first data channel and said second data channel from said line interface means to said central office system, and;

a transmit buffer means for converting said first data channel and said second data channel from said central office system to said line interface means.

* * * * *